US012437739B2

(12) United States Patent
Zhuang et al.

(10) Patent No.: US 12,437,739 B2
(45) Date of Patent: Oct. 7, 2025

(54) METHOD AND APPARATUS FOR DETERMINING VOLUME ADJUSTMENT RATIO INFORMATION, DEVICE, AND STORAGE MEDIUM

(71) Applicant: TENCENT MUSIC ENTERTAINMENT TECHNOLOGY (SHENZHEN) CO., LTD., Shenzhen (CN)

(72) Inventors: Xiaobin Zhuang, Shenzhen (CN); Sen Lin, Shenzhen (CN)

(73) Assignee: TENCENT MUSIC ENTERTAINMENT TECHNOLOGY (SHENZHEN) CO., LTD., Shenzhen (CN)

( * ) Notice: Subject to any disclaimer, the term of this patent is extended or adjusted under 35 U.S.C. 154(b) by 814 days.

(21) Appl. No.: 17/766,911

(22) PCT Filed: Oct. 9, 2020

(86) PCT No.: PCT/CN2020/120044

§ 371 (c)(1),
(2) Date: Apr. 6, 2022

(87) PCT Pub. No.: WO2021/068903

PCT Pub. Date: Apr. 15, 2021

(65) Prior Publication Data

US 2023/0252964 A1 Aug. 10, 2023

(30) Foreign Application Priority Data

Oct. 10, 2019 (CN) ......................... 201910958720.1

(51) Int. Cl.

| | |
|---|---|
| ***G10H 1/46*** | (2006.01) |
| ***G10H 1/00*** | (2006.01) |
| ***G10H 1/36*** | (2006.01) |

(52) U.S. Cl.

CPC ............. *G10H 1/46* (2013.01); *G10H 1/0008* (2013.01); *G10H 1/366* (2013.01); *G10H 2210/005* (2013.01); *G10H 2210/031* (2013.01)

(58) Field of Classification Search

CPC ........ G10H 1/46; G10H 1/0008; G10H 1/366; G10H 2210/005; G10H 2210/031

(Continued)

(56) References Cited

U.S. PATENT DOCUMENTS 6,025,553 A * 2/2000 Lee ........................ G10H 1/365 84/645
8,367,923 B2 * 2/2013 Humphrey ........... G10H 1/0066 84/610

(Continued)

FOREIGN PATENT DOCUMENTS

CN 1924992 A 3/2007
CN 107680571 A * 2/2018 ........... G10L 21/034

(Continued)

OTHER PUBLICATIONS

International Search Report of the International Searching Authority for State Intellectual Property Office of the People's Republic of China in PCT application No. PCT/CN2020/120044 issued on Jan. 12, 2021, which is an International application corresponding to this U.S. application.

(Continued)

*Primary Examiner* — Christina M Schreiber

(74) *Attorney, Agent, or Firm* — Kolitch Romano Dascenzo Gates LLC

(57) ABSTRACT

A method for determining volume adjustment ratio information comprises acquiring a first singing audio and an original accompaniment audio corresponding to the first singing audio, wherein the first singing audio is a user (Continued)

singing audio; acquiring a first audio of a non-singing part in the first singing audio, and acquiring a loudness characteristic of the first audio; acquiring, in the original accompaniment audio, a second audio whose playback duration corresponds to a playback duration of the first audio, and acquiring a loudness characteristic of the second audio; and determining a ratio of the loudness characteristic of the first audio to the loudness characteristic of the second audio as adjustment ratio information for adjusting an accompaniment volume of the first singing audio.

20 Claims, 3 Drawing Sheets

(58) Field of Classification Search
USPC ........................................................... 84/634
See application file for complete search history.

(56) References Cited

U.S. PATENT DOCUMENTS

| | | | | |
|---|---|---|---|---|
| 10,001,968 | B1 * | 6/2018 | Slick | G10H 1/46 |
| 2017/0177295 | A1 * | 6/2017 | Bowen | G06F 3/015 |
| 2018/0219521 | A1 * | 8/2018 | Arimoto | G10H 1/057 |
| 2018/0247675 | A1 * | 8/2018 | Feng | G11B 20/10527 |
| 2019/0005929 | A1 * | 1/2019 | Dabon | G10H 1/0008 |
| 2021/0279030 | A1 * | 9/2021 | Morsy | G10H 1/0091 |
| 2022/0312096 | A1 * | 9/2022 | Zhu | G10L 21/013 |
| 2023/0238016 | A1 * | 7/2023 | Schindler | G10L 21/0364<br>704/278 |
| 2023/0252964 | A1 * | 8/2023 | Zhuang | G10H 1/0008<br>84/634 |
| 2023/0335091 | A1 * | 10/2023 | Morsy | G06F 1/165 |

FOREIGN PATENT DOCUMENTS

| | | | | |
|---|---|---|---|---|
| CN | 107705778 A | | 2/2018 | |
| CN | 109003627 A | | 12/2018 | |
| CN | 109300482 A | | 2/2019 | |
| CN | 109828740 A | | 5/2019 | |
| CN | 109859729 A | | 6/2019 | |
| CN | 110688082 A | * | 1/2020 | G06F 3/165 |

OTHER PUBLICATIONS

The State Intellectual Property Office of People's Republic of China, First Office Action in Patent Application No. CN201910958720.1 issued on Feb. 3, 2021, which is a foreign counterpart application corresponding to this U.S. Patent Application, to which this application claims priority.

Notification of Completion of Formalities for Patent Register and Notification to Grant Patent Right for Invention Application No. 201910958720.1 Issued on Jul. 5, 2021.

Jiang, He; "Observation on the music dissemination of mobile KTV "Changba""; Music Communication, No. 1 2014, Mar. 30, 2014, pp. 76-80.

* cited by examiner

METHOD AND APPARATUS FOR DETERMINING VOLUME ADJUSTMENT RATIO INFORMATION, DEVICE, AND STORAGE MEDIUM

CROSS-REFERENCE TO RELATED APPLICATION

This application is a U.S. national stage of international application No. PCT/CN2020/120044, filed on Oct. 9, 2020, which claims priority to Chinese Patent Application No. 201910958720.1, filed on Oct. 10, 2019, and entitled "METHOD AND APPARATUS FOR DETERMINING VOLUME ADJUSTMENT RATIO INFORMATION, DEVICE, AND STORAGE MEDIUM." Both application are herein incorporated by reference in their entireties.

TECHNICAL FIELD

The present disclosure relates to the field of Internet technologies, and in particular, relates to a method and apparatus for determining volume adjustment ratio information, a device, and a storage medium.

BACKGROUND

With the development of Internet technologies, people have more entertainment options. Singing songs on singing applications has become common entertainment.

SUMMARY

Embodiments of the present disclosure provide a method and apparatus for determining volume adjustment ratio information, a device, and a storage medium, which can avoid the problem that adjustment ratio information for adjusting a volume of an original accompaniment audio is inaccurate for a user due to noises in an accompaniment audio in a singing audio. The technical solutions are as follows:

acquiring a first singing audio and an original accompaniment audio corresponding to the first singing audio, wherein the first singing audio is a user singing audio;

acquiring a first audio of a non-singing part in the first singing audio, and acquiring a loudness characteristic of the first audio;

acquiring, in the original accompaniment audio, a second audio whose playback duration corresponds to a playback duration of the first audio, and acquiring a loudness characteristic of the second audio; and determining a ratio of the loudness characteristic of the first audio to the loudness characteristic of the second audio as adjustment ratio information for adjusting an accompaniment volume of the first singing audio.

Optionally, acquiring the first audio of the non-singing part in the first singing audio includes:

acquiring a playback start time point and a playback end time point of each sentence of lyrics in lyric data corresponding to the first singing audio; and determining a plurality of first audio segments of the non-singing part in the first singing audio based on the playback start time point and the playback end time point of each sentence of lyrics, and acquiring the first audio by combining the plurality of first audio segments according to a playback time sequence.

Optionally, acquiring, in the original accompaniment audio, the second audio whose playback duration corresponds to the playback duration of the first audio includes:

determining, in the original accompaniment audio, a plurality of second audio segments corresponding to the non-singing part in the first singing audio based on the playback start time point and the playback end time point of each sentence of lyrics, and acquiring the second audio by combining the plurality of second audio segments according to playback time sequence.

Optionally, acquiring the loudness characteristics of the first audio includes: dividing the first audio into a plurality of third audio segments with a predetermined duration, and determining a loudness characteristic of each of the third audio segments; and acquiring the loudness characteristic of the second audio includes: dividing the second audio into a plurality of fourth audio segments with a predetermined duration, and determining a loudness characteristic of each of the fourth audio segments.

Optionally, determining the ratio of the loudness characteristic of the first audio to the loudness characteristic of the second audio as the adjustment ratio information for adjusting the accompaniment volume of the first singing audio includes:

selecting a first predetermined number of first loudness characteristics arranged in ascending order from loudness characteristics in the plurality of third audio segments, and selecting a first predetermined number of second loudness characteristics arranged in ascending order from loudness characteristics in the plurality of fourth audio segments; and determining a ratio of a sum of the first predetermined number of first loudness characteristics to a sum of the first predetermined number of second loudness characteristics as the adjustment ratio information for adjusting the accompaniment volume of the first singing audio.

Optionally, determining the loudness characteristic of each of the third audio segments includes: uniformly selecting a second predetermined number of playback time points in each of the third audio segments, and determining a root mean square of audio amplitudes corresponding to all selected playback time points as the loudness characteristic of the third audio segment; and said determining the loudness characteristic of the fourth audio segments includes: uniformly selecting a second predetermined number of playback time points in each of the fourth audio segments, and determining a root mean square of audio amplitudes corresponding to all selected playback time points as the loudness characteristic of the fourth audio segment.

Optionally, after determining the ratio of the loudness characteristic of the first audio to the loudness characteristic of the second audio as the adjustment ratio information for adjusting the accompaniment volume of the first singing audio, the method further includes:

acquiring an adjusted accompaniment audio by adjusting a volume of the original accompaniment audio based on the adjustment ratio information; and recording a second singing audio based on the adjusted accompaniment audio.

Optionally, recording the second singing audio based on the adjusted accompaniment audio includes:

acquiring segment time information for performing segment re-recording on the first singing audio;

extracting a part of the adjusted accompaniment audio based on the segment time information, and recording a singing audio segment based on the part of the accompaniment audio; and acquiring the second singing audio by replacing a singing audio segment in the first singing audio corresponding to the segment time information with the singing audio segment.

According to another aspect, an apparatus for determining volume adjustment ratio information is provided. The apparatus includes:

a first acquiring module, configured to acquire a first singing audio and an original accompaniment audio corresponding to the first singing audio, wherein the first singing audio is a user singing audio;

a second acquiring module, configured to acquire a first audio of a non-singing part in the first singing audio, and acquire a loudness characteristic of the first audio;

a third acquiring module, configured to acquire, in the original accompaniment audio, a second audio whose playback duration corresponds to a playback duration of the first audio, and acquire a loudness characteristic of the second audio; and a determining module, configured to determine a ratio of the loudness characteristic of the first audio to the loudness characteristic of the second audio as adjustment ratio information for adjusting an accompaniment volume of the first singing audio.

Optionally, the second acquiring module is configured to:

acquire a playback start time point and a playback end time point of each sentence of lyrics in lyric data corresponding to the first singing audio; and determine a plurality of first audio segments of the non-singing part in the first singing audio based on the playback start time point and the playback end time point of each sentence of lyrics, and acquire the first audio by combining the plurality of first audio segments according to a playback time sequence.

Optionally, the third acquiring module is configured to:

determine, in the original accompaniment audio, a plurality of second audio segments corresponding to the non-singing part in the first singing audio based on the playback start time point and the playback end time point of each sentence of lyrics, and acquire the second audio by combining the plurality of second audio segments according to playback time sequence.

Optionally, the second acquiring module is configured to divide the first audio into a plurality of third audio segments with a predetermined duration, and determine a loudness characteristic of each of the third audio segments; and the third acquiring module is configured to divide the second audio into a plurality of fourth audio segments with a predetermined duration, and determine a loudness characteristic of each of the fourth audio segments.

Optionally, the determining module is configured to:

select a first predetermined number of first loudness characteristics arranged in ascending order from loudness characteristics in the plurality of third audio segments, and select a first predetermined number of second loudness characteristics arranged in ascending order from loudness characteristics in the plurality of fourth audio segments; and determine a ratio of a sum of the first predetermined number of first loudness characteristics to a ratio of a sum of the first predetermined number of second loudness characteristics as the adjustment ratio information for adjusting the accompaniment volume of the first singing audio.

Optionally, the second acquiring module is configured to uniformly select a second predetermined number of playback time points in each of the third audio segments, and determine a root mean square of audio amplitudes corresponding to all selected playback time points as the loudness characteristic of the third audio segment; and the third acquiring module is configured to uniformly select a second predetermined number of playback time points in each of the fourth audio segments, and determine a root mean square of audio amplitudes corresponding to all selected playback time points as the loudness characteristic of the fourth audio segment.

Optionally, the apparatus further includes a recording module, wherein the recording module is configured to:

acquire an adjusted accompaniment audio by adjusting a volume of the original accompaniment audio based on the adjustment ratio information; and record a second singing audio based on the adjusted accompaniment audio.

Optionally, the recording module is configured to:

acquire segment time information for performing segment re-recording on the first singing audio;

extract a part of the adjusted accompaniment audio based on the segment time information, and record a singing audio segment based on the part of the accompaniment audio; and acquire the second singing audio by replacing a singing audio segment in the first singing audio corresponding to the segment time information with the singing audio segment.

According to still another aspect, a computer device is provided. The computer device includes a processor and a memory storing at least one instruction, wherein the processor, when loading and executing the at least one instruction, is caused to perform the method for determining volume adjustment ratio information as defined above.

According to yet another aspect, a computer-readable storage medium is provided. The computer-readable storage medium stores at least one instruction therein, wherein the at least one instruction, when loaded and executed by a processor, causes the processor to perform the method for determining volume adjustment ratio information as defined above.

BRIEF DESCRIPTION OF THE DRAWINGS

To describe the technical solutions in embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION OF THE EMBODIMENTS

Figure 1:
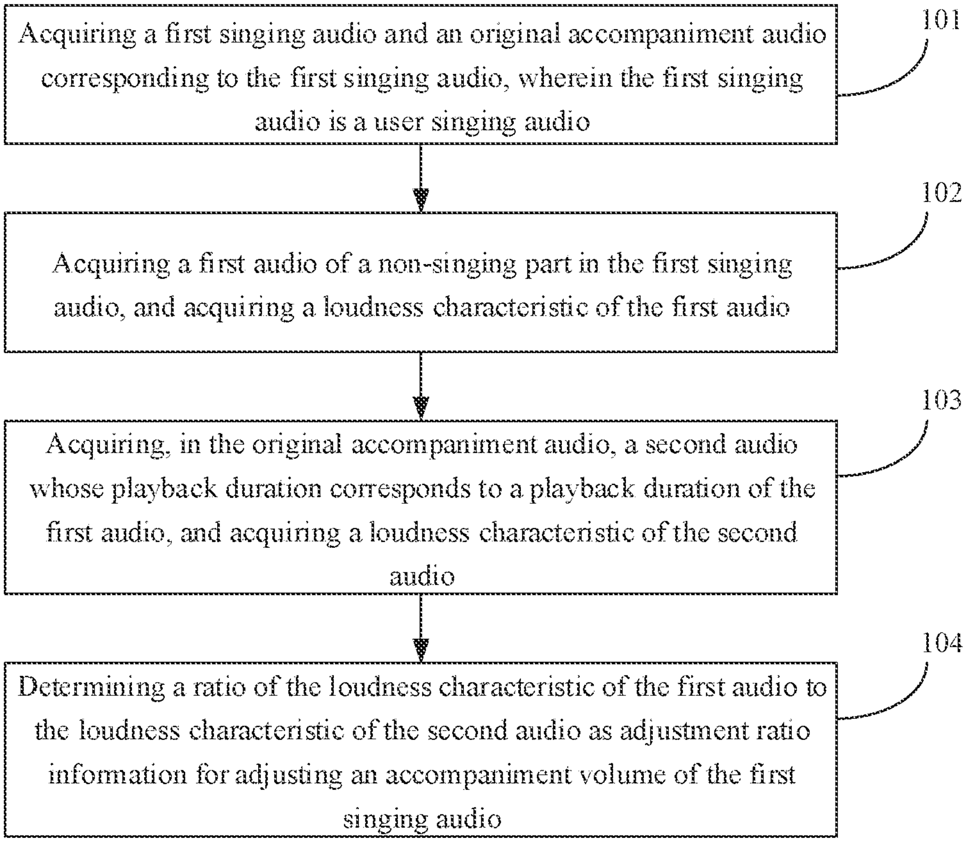
FIG. 1 is a flowchart of a method for determining volume adjustment ratio information according to an embodiment of the present disclosure.

For a clearer description of the objectives, technical solutions, and advantages in the present disclosure, embodiments of the present disclosure are described in further detail hereafter with reference to the accompanying drawings.

A singing application provides an accompaniment audio for a user, and the user sings a song with the accompaniment audio. A terminal running the singing application records the user's vocal audio, synthesizes the vocal audio and the accompaniment audio into a singing audio, and publishes the singing audio on the Internet. Before the vocal audio and the accompaniment audio are synthesized, the user may adjust a volume of the accompaniment audio to acquire an adjusted accompaniment audio, and then synthesize the adjusted accompaniment audio with the vocal audio. After the user publishes the singing audio on the Internet, a second recording may be performed on the published singing audio, that is, the user may select segments with poor singing performance in the original singing audio (that is, the published singing audio) for second recording. During the second recording, the terminal provides the user with the accompaniment audio at the adjusted volume, records the user's vocal audios, synthesizes the singing audios of the selected segments, and replaces the selected segments in the original singing audio with the singing audios of the selected segments, thus realizing second recording of the original singing audio. Currently, a manner in which the terminal acquires the accompaniment audio adjusted by the user is to filter out the vocal audio from the original singing audio based on a predetermined algorithm to extract the accompaniment audio. However, due to the defects of the algorithm itself, there are many noises in the extracted accompaniment audio. To eliminate the noises, the extracted accompaniment audio may be compared with the original accompaniment audio (that is, the accompaniment audio whose volume has not been adjusted by the user) to acquire adjustment ratio information for adjusting the volume of the original accompaniment audio. Then, the accompaniment audio without noises after user adjustment is acquired based on the volume adjustment ratio information.

In the process of implementing the present disclosure, the inventors found that the prior art has at least the following problems:

The noises in the accompaniment audio extracted by using the algorithm may affect a comparison result with the original accompaniment audio, resulting in inaccurate volume adjustment ratio information.

A method for determining volume adjustment ratio information provided in the present disclosure may be executed by a terminal. The terminal may run a singing application, and may be provided with a microphone, a screen, a speaker, and other components. The terminal has a communication function and may access the Internet. A processor is disposed in the terminal to process data information. The terminal may be a mobile phone, a tablet computer, a smart wearable device, a desktop computer, a notebook computer, or the like.

The singing application may be run on the terminal, and a user may select a song he/she wants to record in the singing application. The singing application sends identification information of the song selected by the user to the server, and the server may send an accompaniment audio and a lyric file corresponding to the song to the terminal based on the identification information of the song. After receiving the accompaniment audio, the terminal may play back the accompaniment audio and display, according to a playback progress, lyrics on the screen of the terminal based on the lyric file. At the same time, the terminal starts a recording function, and the user may sing the song according to the lyrics displayed by the singing application on the terminal screen. The terminal records the user's vocal audio and synthesizes the vocal audio and the accompaniment audio corresponding to the song into a singing audio. The user may publish the singing audio as a karaoke musical piece on the Internet for other users to listen to. Before the terminal synthesizes the vocal audio and the accompaniment audio into the singing audio, the user may adjust a volume of the accompaniment audio, such that the accompaniment audio matches the vocal audio more in volume, and then the synthesized singing audio can better satisfy the user's auditory feeling.

After the user publishes the karaoke song work on the Internet, second recording may be performed on the published karaoke musical piece, that is, the user may select segments with poor singing performance in the original singing audio (that is, the published karaoke musical piece) for second recording, and then replace the segments with poor singing performance selected by the user with a newly-recorded singing audio. The terminal acquires the accompaniment audio adjusted by the user in the original singing audio, records the vocal audio re-sung by the user, and finally synthesizes singing audios of the selected segments to replace the selected segments in the original singing audio with the singing audios of the selected segments, thus realizing second recording of the karaoke musical piece. In the method for determining volume adjustment ratio information according to the embodiments of the present disclosure, the information for adjusting the volume of the original accompaniment audio can be acquired based on the user's singing audio and the original accompaniment audio, and the terminal acquires the accompaniment audio whose volume is adjusted by the user based on the volume adjustment information.

FIG. 1 is a flowchart of a method for determining volume adjustment ratio information according to an embodiment of the present disclosure. Referring to FIG. 1, the method includes:

In step 101, a first singing audio and an original accompaniment audio corresponding to the first singing audio are acquired.

The first singing audio is a user singing audio and is synthesized by the user's vocal audio and the original accompaniment audio.

In some embodiments, the first singing audio (that is, a karaoke musical piece) may be synthesized by the vocal audio recorded by the user through a singing application and the accompaniment audio of the corresponding song. The original accompaniment audio is the song accompaniment audio corresponding to the first singing audio. The first singing audio may be stored locally at the terminal or acquired from a server. In the case that the first singing audio is acquired from the server, the terminal may send a download request with the first singing audio to the server, and the server may send the first singing audio, the original accompaniment audio of the first singing audio, and a lyric file of the song corresponding to the first singing audio to the terminal based on the download request. The lyric file records a playback start time point and a playback end time point of each sentence of lyrics.

In step 102, a first audio of a non-singing part in the first singing audio is acquired, and a loudness characteristic of the first audio is acquired.

The loudness characteristic is characteristic information of an audio volume, and may be a value representing the volume.

In some embodiments, the first singing audio is synthesized by the vocal audio sung by the user and the accompaniment audio of the corresponding song, and the terminal may process the first singing audio after acquiring the first singing audio. Audio parts without the singing vocal in the first singing audio are extracted, and a plurality of extracted audio parts without the singing voice are combined to acquire the first audio. After the first audio is acquired, volume information of the first audio may be acquired, that is, the loudness characteristic of the first audio is acquired.

Optionally, the first audio of the non-singing part may be acquired by segmenting the first singing audio based on the time points recorded in the lyric file of the song corresponding to the first singing audio. The corresponding processing may be as follows: acquiring the playback start time point and the playback end time point of each sentence of lyrics in the lyric data corresponding to the first singing audio; determining a plurality of first audio segments of the non-singing part in the first singing audio based on the playback start time point and the playback end time point of each sentence of lyrics; and acquiring the first audio by combining the plurality of first audio segments according to a playback time sequence.

The first audio segment is a part of pure accompaniment audio in the first singing audio, and the first audio is acquired by combining the plurality of first audio segments according to the playback time sequence.

Figure 2:
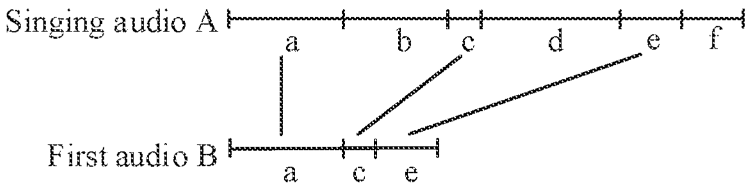
FIG. 2 is a schematic diagram of a singing audio processing method according to an embodiment of the present disclosure.

In some embodiments, the server may send the lyric file of the song corresponding to the first singing audio to the terminal, and a plurality of time points are marked in the lyric file, including the playback start time point and the playback end time point of each sentence of lyrics. The first singing audio may be divided into a plurality of audios based on the playback start time point and the playback end time point of each sentence of lyrics in the lyric file, audios corresponding to the lyrics are removed, audios of the pure accompaniment part are retained as the first audio segments, and then the first audio is acquired by combining the first audio segments according to a sequence of the time points in the lyric file. As shown in FIG. 2, a first singing audio A may be divided into audio segments a, b, c, d, e, and f, wherein the audio segments b, d, and f contain the vocal audio and the accompaniment audio, the audio segments a, c and e only contain the accompaniment audio, and a first audio B is acquired by combining the audio segments a, c, and e in time sequence.

In addition, the terminal may further set a duration threshold. In the case that a time interval between a playback end time point of a sentence of lyrics and a playback start time point of the next sentence of lyrics in the lyric file is less than the set duration threshold, these two time points may be ignored, and an audio between these two time points will not be divided.

After the first audio is acquired, the first audio may be divided into a plurality of audio segments to acquire a loudness characteristic of each audio segment. The corresponding processing is as follows: dividing the first audio into a plurality of third audio segments with a predetermined duration, and determining a loudness characteristic of each of the third audio segments.

In some embodiments, the terminal may divide the first audio into a plurality of third audio segments based on the predetermined duration, and the third audio segments are equal in duration. The terminal may further set a sampling rate, to sample an audio amplitude in each of the third audio segments acquired through division. The loudness characteristic of each of the third audio segments may be determined based on sample values of each audio segment.

The following processing may be performed to determine the loudness characteristic of each of the third audio segments: uniformly selecting a second predetermined number of playback time points in each of the third audio segments, and determining a root mean square of audio amplitudes corresponding to all selected playback time points as the loudness characteristic of the third audio segment.

In some embodiments, for each of the third audio segments, sampling may be performed several times on the audio amplitude in the third audio segment, and a root mean square of a plurality of sampled amplitudes of the third audio segment is calculated as the loudness characteristic of the third audio segment.

In step 103, a second audio whose playback duration corresponds to a playback duration of the first audio is acquired in the original accompaniment audio, and a loudness characteristic of the second audio is acquired.

The first audio may include a plurality of audio segments without the singing vocal, each audio segment corresponds to a playback duration. The playback duration may be represented by a playback start time point and a playback end time point of the audio segment in the original accompaniment audio, and the duration of the first audio may be a sum of playback durations of these audio segments.

In some embodiments, the server sends the original accompaniment audio (that is, the accompaniment audio whose volume has not been adjusted by the user) of the song corresponding to the first singing audio to the terminal, and the terminal may process the original accompaniment audio according to the method for processing the first singing audio in step 102, extracts audio segments in the original accompaniment audio whose playback durations are the same as playback durations of the audio segments without the singing vocal in the first singing audio, and combines the extracted audio segments to acquire the second audio. The playback durations of the audio segments included in the second audio correspond to the playback durations of the audio segments without the singing vocal in the first audio.

Optionally, the terminal may acquire the second audio by dividing the original accompaniment audio based on the lyric file of the song corresponding to the first singing audio. The corresponding processing may be as follows: determining, in the original accompaniment audio, a plurality of second audio segments corresponding to the non-singing part in the first singing audio based on the playback start time point and the playback end time point of each sentence of lyrics, and acquiring the second audio by combining the plurality of second audio segments according to playback time sequence.

The playback start time point and the playback end time point of each second audio segment in the original accompaniment audio correspond to the playback start time point and the playback end time point of each first audio segment in the first singing audio in step 102, and the second audio is acquired by combining the plurality of second audio segments according to time sequence.

Figure 3:
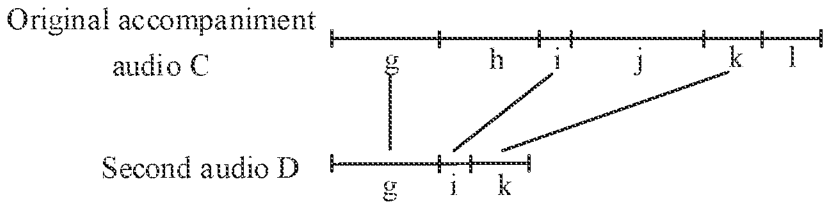
FIG. 3 is a schematic diagram of an original accompaniment audio processing method according to an embodiment of the present disclosure.

In some embodiments, the terminal may divide the original accompaniment audio into a plurality of audio segments based on the playback start time point and the playback end time point of each sentence of lyrics in the lyric file, audios corresponding to the lyrics are removed, remained audio segments are used as the second audio segments, and the second audio is acquired by combining the second audio segments based on the sequence of the time points in the lyric file. As shown in FIG. 3, an original accompaniment audio C may be divided into audio segments g, h, i, j, k, and l, wherein the audio segments g, i, and k correspond to the foregoing audio segments a, c, and e. A second audio D is acquired by combining the audio segments g, i, and k in time sequence.

After the second audio is acquired, the second audio may be divided into a plurality of audio segments, and the loudness characteristic of each audio segment is acquired. The corresponding processing is as follows: dividing the second audio into a plurality of fourth audio segments with a predetermined duration, and determining a loudness characteristic of each of the fourth audio segments.

In some embodiments, the terminal may divide the second audio into a plurality of fourth audio segments based on the predetermined duration, and fourth audio segments are equal in duration. The terminal may further set a sampling rate, and sample an audio amplitude in each of the fourth audio segments acquired through division based on the sampling rate, wherein the sample rate is the same as the sample rate in step 102. The loudness characteristic of each of the fourth audio segments may be determined based on sample values of each audio segment.

The following processing may be performed to determine the loudness characteristic of each of the fourth audio segments: uniformly selecting a second predetermined number of playback time points in each of the fourth audio segments, and determining a root mean square of audio amplitudes corresponding to all selected playback time points as the loudness characteristic of the fourth audio segment.

In some embodiments, for each of the fourth audio segments, sampling may be performed several times on the audio amplitude in the fourth audio segment, and a root mean square of a plurality of sampled amplitudes of the fourth audio segment is calculated as the loudness characteristic of the fourth audio segment.

In step 104, a ratio of the loudness characteristic of the first audio to the loudness characteristic of the second audio is determined as adjustment ratio information for adjusting the accompaniment volume of the first singing audio.

In some embodiments, the ratio of the loudness characteristic of the first audio to the loudness characteristic of the second audio may be calculated, and a gain value in volume of the second audio relative to the first audio is determined based on the ratio, so as to determine the ratio information for adjusting the volume of the original accompaniment audio by the user.

Optionally, the loudness characteristic of the first audio and the loudness characteristic of the second audio are acquired based on the loudness characteristics of the third audio segments and the loudness characteristics of the fourth audio segments in step 103 and step 104. The corresponding processing is as follows: selecting a first predetermined number of first loudness characteristics arranged in ascending order from loudness characteristics in the plurality of third audio segments, and selecting a first predetermined number of second loudness characteristics arranged in ascending order from loudness characteristics in the plurality of fourth audio segments; and determining a ratio of a sum of the first predetermined number of first loudness characteristics to a sum of the first predetermined number of second loudness characteristics as the adjustment ratio information for adjusting the accompaniment volume of the first singing audio.

In some embodiments, the loudness characteristics of all the third audio segments may be arranged in ascending order based on values of the loudness characteristics. To prevent the noises in the first audio from affecting the volume values, the first part of the loudness characteristics of all the third audio segments after sorting may be selected and summed. For example, the first half of the loudness characteristics of the third audio segments in the sorted third audio segments may be summed to acquire the loudness characteristic of the first audio. Similarly, the loudness characteristics of all the fourth audio segments may be arranged in ascending order based on values of the loudness characteristics. After sorting, the number of loudness characteristics the same as the number of selected loudness characteristics of the third audio segments may be selected from the loudness characteristics of all the fourth audio segments and may be summed. For example, the first half of the loudness characteristics of the fourth audio in the sorted fourth audio segments may be summed to acquire the loudness characteristic of the second audio. Finally, the ratio of the volume information of the first audio to the volume information of the second audio is calculated, and the ratio is determined as the adjustment ratio information for adjusting the accompaniment volume of the first singing audio by the user.

For example, the predetermined duration may be set to t, and the sampling rate may be set to s. Then, the number of sampling points in each audio segment is N=s*t, and N amplitudes are acquired for each audio segment. Then, the root mean square formula may be used to acquire the volume value of each audio segment based on the N amplitudes of each audio segment. The formula is as follows:

$$L_i = \sqrt{\frac{1}{N}\sum_{j=i*N}^{(i+1)*N} S_j^2}$$

wherein $L_i$ is a loudness characteristic of the $i^{th}$ audio segment, N is the number of sampling points in each audio segment, and $S_j$ is audio amplitude of the $j^{th}$ sampling point. Then, the acquired $L_1$ to $L_i$ are sorted in ascending order to acquire an array, and the first half of elements in the array are selected and summed to acquire the loudness characteristic $V_1$ of the first audio. The second audio is processed in the same way as the first audio to acquire the loudness characteristic $V_2$ of the second audio. Then, the ratio of $V_1$ to $V_2$ is calculated, and the ratio is determined as the adjustment ratio information for adjusting the accompaniment volume of the first singing audio by the user.

Optional, an adjusted accompaniment audio is acquired by adjusting the volume of the original accompaniment audio based on the adjustment ratio information; and a second singing audio is recorded based on the adjusted accompaniment audio.

In some embodiments, the adjustment ratio information may be the ratio of the loudness characteristic of the first audio to the loudness characteristic of the second audio.

After the adjustment ratio information is acquired, the original accompaniment audio may be adjusted based on the adjustment ratio information. The adjusted accompaniment audio may be acquired by multiplying the amplitude of each sampling point of the original accompaniment audio with the adjustment ratio information. After the adjusted accompaniment audio is acquired, the terminal may play the adjusted accompaniment audio and enable the recording function to record the user's vocal audio again. The adjusted accompaniment audio and the recorded user's vocal audio are synthesized to acquire the second singing audio.

Optionally, the second singing audio may be recorded based on one or more durations specified by the user. The corresponding processing is as follows: acquiring segment time information for performing segment re-recording on the first singing audio; extracting a part of the adjusted accompaniment audio based on the segment time information, and recording a singing audio segment based on the part of the accompaniment audio; and acquiring the second singing audio by replacing a singing audio segment in the first singing audio corresponding to the segment time information with the singing audio segment.

The segment time information is a start time point and an end time point of a re-recorded segment.

In some embodiments, before recording the second singing audio, the user selects an audio duration to be sung again in the first singing audio. For example, the singing application may pre-store the singing start time point and singing end time point of each sentence of lyrics in the song corresponding to the first singing audio, and the user may select the sentence of lyric to be sung again. After receiving a lyric selection instruction, the singing application may determine, based on the pre-stored singing start time point and singing end time point of each sentence of lyrics, a singing start time point of the first sentence of lyric and a singing end time point of the last sentence of lyric in the lyrics selected by the user, as the start time point and end time point of the re-recorded segment, and then extract a part of the accompaniment audio from the adjusted accompaniment audio based on the start time point and end time point of the re-recorded segment. The terminal plays the part of accompaniment audio and records the user's vocal audio at the same time, then synthesizes the part of accompaniment audio and the vocal audio, and replaces the singing audio segment in the first singing audio whose playback duration is the same as a playback duration of the part of the accompaniment audio, such that the second singing audio can be acquired after the second recording.

According to the present disclosure, the first audio of the non-singing part in the user's singing audio is extracted and the second audio corresponding to the first audio in time in the original accompaniment audio is extracted, the loudness characteristics of the first audio and the second audio are determined, and then the ratio of the loudness characteristics of the first audio to the loudness characteristic of the second audio is determined as the adjustment ratio information for adjusting the accompaniment volume of the singing audio. In the present disclosure, the accompaniment audio in the singing audio is not extracted by using an algorithm, such that the problem that adjustment ratio information for adjusting the volume of the original accompaniment audio is inaccurate for the user due to noises in the accompaniment audio in the singing audio can be avoided.

All of the above optional technical solutions can be combined arbitrarily to form the disclosed optional embodiments. Details are not described here.

Figure 4:
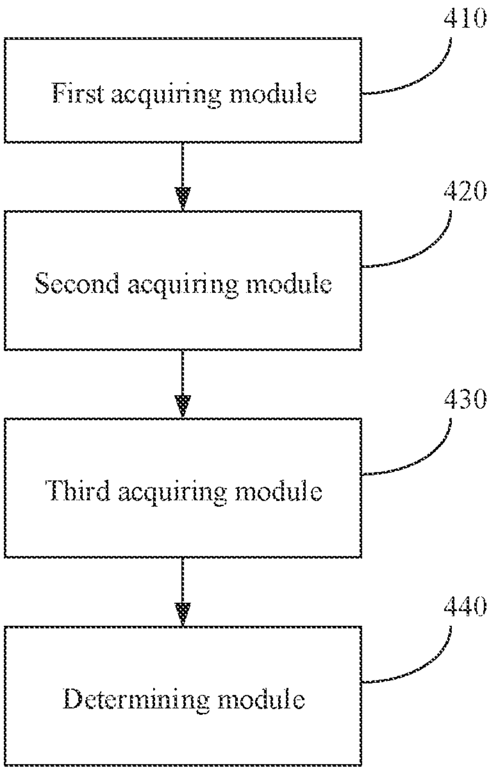
FIG. 4 is a schematic structural diagram of an apparatus for determining volume adjustment ratio information according to an embodiment of the present disclosure.

FIG. 4 is a schematic structural diagram of an apparatus for determining volume adjustment ratio information according to an embodiment of the present disclosure. The apparatus may be the terminal in the foregoing embodiment. Referring to FIG. 4, the apparatus includes:

- a first acquiring module 410, configured to acquire a first singing audio and an original accompaniment audio corresponding to the first singing audio, wherein the first singing audio is a user singing audio;
- a second acquiring module 420, configured to acquire a first audio of a non-singing part in the first singing audio, and acquire a loudness characteristic of the first audio;
- a third acquiring module 430, configured to acquire, in the original accompaniment audio, a second audio whose playback duration corresponds to a playback duration of the first audio, and acquire a loudness characteristic of the second audio; and
- a determining module 440, configured to determine a ratio of the loudness characteristic of the first audio to the loudness characteristic of the second audio as adjustment ratio information for adjusting an accompaniment volume of the first singing audio.

Optionally, the second acquiring module 420 is configured to:

- acquire a playback start time point and a playback end time point of each sentence of lyrics in lyric data corresponding to the first singing audio; and
- determine a plurality of first audio segments of the non-singing part in the first singing audio based on the playback start time point and the playback end time point of each sentence of lyrics, and acquire the first audio by combining the plurality of first audio segments according to a playback time sequence.

Optionally, the third acquiring module 430 is configured to:

- determine, in the original accompaniment audio, a plurality of second audio segments corresponding to the non-singing part in the first singing audio based on the playback start time point and the playback end time point of each sentence of lyrics, and acquire the second audio by combining the plurality of second audio segments according to playback time sequence.

Optionally, the second acquiring module 420 is configured to divide the first audio into a plurality of third audio segments with a predetermined duration, and determine a loudness characteristic of each of the third audio segments; and

- the third acquiring module is configured to divide the second audio into a plurality of fourth audio segments with a predetermined duration, and determine a loudness characteristic of each of the fourth audio segments.

Optionally, the determining module 440 is configured to:

- select a first predetermined number of first loudness characteristics arranged in ascending order from loudness characteristics in the plurality of third audio segments, and select a first predetermined number of second loudness characteristics arranged in ascending order from loudness characteristics in the plurality of fourth audio segments; and
- determine a ratio of a sum of the first predetermined number of first loudness characteristics to a sum of the first predetermined number of second loudness characteristics as the adjustment ratio information for adjusting the accompaniment volume of the first singing audio.

Optionally, the second acquiring module 420 is configured to uniformly select a second predetermined number of playback time points in each of the third audio segments, and determine a root mean square of audio amplitudes corresponding to all selected playback time points as the loudness characteristic of the third audio segment; and the third acquiring module 430 is configured to uniformly select a second predetermined number of playback time points in each of the fourth audio segments, and determine a root mean square of audio amplitudes corresponding to all selected playback time points as the loudness characteristic of the fourth audio segment.

Optionally, the apparatus further includes a recording module, configured to:

acquire an adjusted accompaniment audio by adjusting a volume of the original accompaniment audio based on the adjustment ratio information; and record a second singing audio based on the adjusted accompaniment audio.

Optionally, the recording module is configured to:

acquire segment time information for performing segment re-recording on the first singing audio;

extract a part of the adjusted accompaniment audio based on the segment time information, and record a singing audio segment based on the part of the accompaniment audio; and acquire the second singing audio by replacing a singing audio segment in the first singing audio corresponding to the segment time information with the singing audio segment.

It should be noted that in the case that the apparatus for determining volume adjustment ratio information provided in the foregoing embodiment determines the volume adjustment ratio information, illustrations are made only by an example of division into the above-mentioned functional modules. In practice, the above-mentioned functions may be allocated to different functional modules according to needs, that is, the internal structure of the apparatus may be divided into a plurality of sub-modules to complete all or some of the functions. In addition, the apparatus for determining volume adjustment ratio information provided in the above embodiments belongs to the same concept as the embodiments of the method for determining volume adjustment ratio information, and the specific implementation process is detailed in the method embodiment, which is not repeated here.

Figure 5:
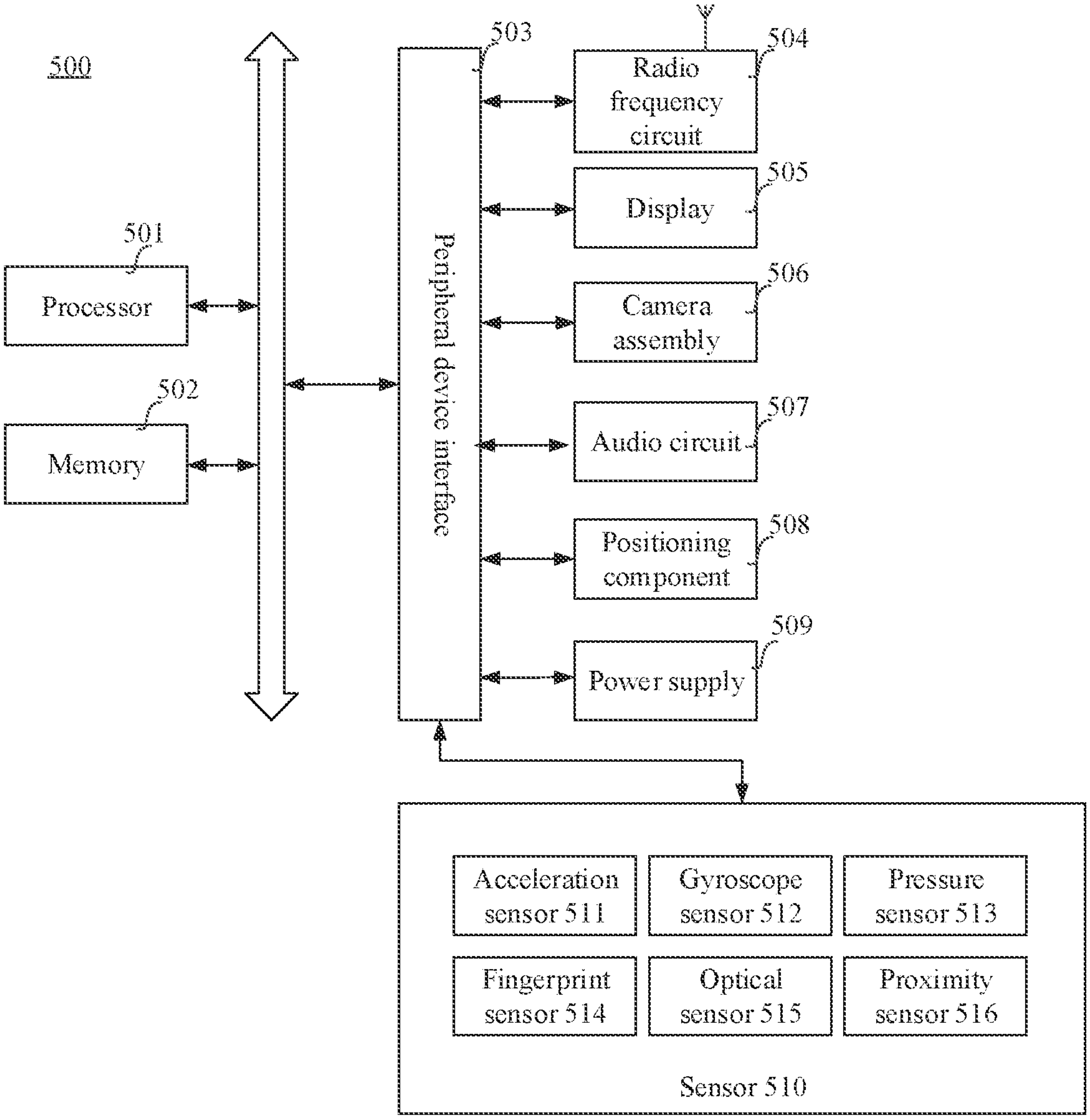
FIG. 5 is a schematic structural diagram of a terminal according to an embodiment of the present disclosure.

FIG. 5 is a structural block diagram of a terminal 500 according to an exemplary embodiment of the present disclosure. The terminal 500 may be a smart phone, a tablet computer, a Moving Picture Experts Group Audio Layer III (MP3) player, a Moving Picture Experts Group Audio Layer IV (MP4) player, a notebook computer, or a desktop computer. The terminal 500 may also be referred to as user equipment, a portable terminal, a laptop terminal, a desktop terminal, or the like.

Generally, the terminal 500 includes a processor 501 and a memory 502.

The processor 501 may include one or more processing cores, for example, a 4-core processor or an 8-core processor. The processor 501 may be implemented by using at least one of the following hardware forms: digital signal processing (DSP), a field-programmable gate array (FPGA), and a programmable logic array (PLA). The processor 501 may alternatively include a main processor and a coprocessor. The main processor is configured to process data in an awake state, also referred to as a central processing unit (CPU), and the coprocessor is a low-power processor configured to process data in a standby state. In some embodiments, the processor 501 may be integrated with a graphics processing unit (GPU). The GPU is configured to be responsible for rendering and drawing content that a display needs to display. In some embodiments, the processor 501 may further include an artificial intelligence (AI) processor. The AI processor is configured to process computing operations related to machine learning.

The memory 502 may include one or more computer-readable storage media, which may be non-transitory. The memory 502 may further include a high-speed random access memory and a non-volatile memory such as one or more magnetic disk storage devices and a flash storage device. In some embodiments, the non-transitory computer-readable storage medium in the memory 502 is configured to store at least one instruction. The at least one instruction, when executed by the processor 501, causes the processor 501 to perform the method for determining volume adjustment ratio information according to the method embodiments of the present disclosure.

In some embodiments, the terminal 500 may further optionally include a peripheral device interface 503 and at least one peripheral device. The processor 501, the memory 502, and the peripheral device interface 503 may be connected through a bus or a signal cable. Each peripheral device may be connected to the peripheral device interface 503 through a bus, a signal cable, or a circuit board. In some embodiments, the peripheral device includes at least one of the following: a radio frequency circuit 504, a display 505, a camera assembly 506, an audio circuit 507, a positioning component 508, and a power supply 509.

The peripheral device interface 503 may be configured to connect at least one peripheral device related to input/output (I/O) to the processor 501 and the memory 502. In some embodiments, the processor 501, the memory 502, and the peripheral device interface 503 are integrated into the same chip or circuit board; in some other embodiments, any one or two of the processor 501, the memory 502, and the peripheral device interface 503 may be implemented on an independent chip or circuit board. This is not limited in the embodiments of the present disclosure.

The radio frequency circuit 504 is configured to receive and transmit a radio frequency (RF) signal, also referred to as an electromagnetic signal. The radio frequency circuit 504 communicates with a communications network and another communications device by using the electromagnetic signal. The radio frequency circuit 504 may convert an electric signal into an electromagnetic signal for transmission, or convert a received electromagnetic signal into an electric signal. In some embodiments, the radio frequency circuit 504 includes an antenna system, an RF transceiver, one or more amplifiers, a tuner, an oscillator, a digital signal processor, a codec chip set, a subscriber identity module card, and the like. The radio frequency circuit 504 may communicate with another terminal through at least one wireless communication protocol. The wireless communication protocol includes, but is not limited to: a metropolitan area network, generations of mobile communication networks (2G, 3G, 4G, and 5G), a wireless local area network and/or a wireless fidelity (Wi-Fi) network. In some embodiments, the radio frequency circuit 504 may further include a near field communication (NFC) related circuit, and is not limited in the present disclosure.

The display 505 is configured to display a user interface (UI). The UI may include a graph, a text, an icon, a video, and any combination thereof. In the case that the display 505 is a touch display, the display 505 is further capable of acquiring a touch signal on or above a surface of the display 505. The touch signal may be inputted to the processor 501 for processing as a control signal. In this case, the display 505 may be further configured to provide a virtual button and/or a virtual keyboard, which is also referred to as a soft button and/or a soft keyboard. In some embodiments, one display 505 may be disposed on a front panel of the terminal 500. In some other embodiments, at least two displays 505 may be disposed on different surfaces of the terminal 500 respectively or in a folded design. In still other embodiments, the display 505 may be a flexible display, disposed on a curved surface or a folded surface of the terminal 500. Even, the display 505 may be further set in a non-rectangular irregular pattern, namely, a special-shaped screen. The display 505 may be prepared by using materials such as a liquid crystal display (LCD), an organic light-emitting diode (OLED), or the like.

The camera assembly 506 is configured to acquire an image or a video. In some embodiments, the camera assembly 506 includes a front-facing camera and a rear-facing camera. Generally, the front-facing camera is disposed on a front panel of the terminal, and the rear-facing camera is disposed on a back surface of the terminal. In some embodiments, at least two rear-facing cameras are provided, which are respectively any one of a main camera, a depth-of-field camera, a wide-angle camera, and a telephoto camera, to implement a background blurring function by fusing the main camera and the depth-of-field camera, and panoramic shooting and virtual reality (VR) shooting functions or other fusing shooting functions by fusing the main camera and the wide-angle camera. In some embodiments, the camera assembly 506 may further include a flash. The flash may be a single color temperature flash or a double color temperature flash. The double color temperature flash is a combination of a warm light flash and a cold light flash, and may be used for light compensation under different color temperatures.

The audio circuit 507 may include a microphone and a speaker. The microphone is configured to collect sound waves of a user and an environment, and convert the sound waves into electric signals and input the electrical signals into the processor 501 for processing, or input the electrical signals into the radio frequency circuit 504 to implement voice communication. For stereo sound collection or noise reduction, a plurality of microphones are provided, which are respectively disposed at different parts of the terminal 500. The microphone may be further an array microphone or an omnidirectional collection microphone. The speaker is configured to convert electric signals from the processor 501 or the radio frequency circuit 504 into sound waves. The speaker may be a conventional thin-film speaker or a piezoelectric ceramic speaker. In the case that the speaker is the piezoelectric ceramic speaker, electric signals are not only converted into sound waves audible to human, but also converted into sound waves inaudible to human for ranging and other purposes. In some embodiments, the audio circuit 507 may further include an earphone jack.

The positioning component 508 is configured to position a current geographic location of the terminal 500 to implement a navigation or a location based service (LBS). The positioning component 508 may be the United States' Global Positioning System (GPS), China's BeiDou Navigation Satellite System (BDS), Russia's Global Navigation Satellite System (GLONASS), or the European Union's Galileo Satellite Navigation System (Galileo).

The power supply 509 is configured to supply power for various components in the terminal 500. The power supply 509 may be an alternating current, a direct current, a disposable battery, or a rechargeable battery. In the case that the power supply 509 includes the rechargeable battery, the rechargeable battery may be a wired rechargeable battery or a wireless rechargeable battery. The rechargeable battery may be further configured to support a fast charge technology.

In some embodiments, the terminal 500 further includes one or more sensors 510. The one or more sensors 510 include, but are not limited to: an acceleration sensor 511, a gyroscope sensor 512, a pressure sensor 513, a fingerprint sensor 514, an optical sensor 515, and a proximity sensor 516.

The acceleration sensor 511 may detect acceleration on three coordinate axes of a coordinate system established by the terminal 500. For example, the acceleration sensor 511 may be configured to detect components of gravity acceleration on the three coordinate axes. The processor 501 may control, according to a gravity acceleration signal collected by the acceleration sensor 511, the display 505 to display the user interface in a landscape view or a portrait view. The acceleration sensor 511 may be further configured to collect game or user motion data.

The gyroscope sensor 512 may detect a body direction and a rotation angle of the terminal 500. The gyroscope sensor 512 may cooperate with the acceleration sensor 511 to collect a 3D action performed by the user on the terminal 500. The processor 501 may implement the following functions according to the data collected by the gyroscope sensor 512: motion sensing (such as changing the UI according to a tilt operation of the user), image stabilization at shooting, game control, and inertial navigation.

The pressure sensor 513 may be disposed on a side frame of the terminal 500 and/or a lower layer of the display 505. In the case that the pressure sensor 513 is disposed on the side frame of the terminal 500, a holding signal of the user on the terminal 500 may be detected. The processor 501 performs left and right hand recognition or a quick operation according to the holding signal collected by the pressure sensor 513. In the case that the pressure sensor 513 is disposed on the lower layer of the display 505, the processor 501 controls an operable control on the UI according to a pressure operation of the user on the display 505. The operable control includes at least one of a button control, a scroll bar control, an icon control, and a menu control.

The fingerprint sensor 514 is configured to collect a fingerprint of a user, and the processor 501 identifies an identity of the user according to the fingerprint collected by the fingerprint sensor 514, or the fingerprint sensor 514 identifies an identity of the user according to the collected fingerprint. In the case that the identity of the user is identified as a trusted identity, the processor 501 authorizes the user to perform a related sensitive operation. The sensitive operation includes unlocking a screen, viewing encrypted information, downloading software, payment, changing settings, and the like. The fingerprint sensor 514 may be disposed on a front surface, a back surface, or a side surface of the terminal 500. In the case that the terminal 500 is provided with a physical button or a vendor logo, the fingerprint sensor 514 may be integrated with the physical button or the vendor logo.

The optical sensor 515 is configured to collect ambient light intensity. In an embodiment, the processor 501 may control display brightness of the display 505 according to the ambient light intensity collected by the optical sensor 515. In some embodiments, in the case that the ambient light intensity is relatively high, the display brightness of the display 505 is turned up. In the case that the ambient light intensity is relatively low, the display brightness of the display 505 is turned down. In another embodiment, the processor 501 may further dynamically adjust a camera parameter of the camera assembly 506 according to the ambient light intensity collected by the optical sensor 515.

The proximity sensor 516, also referred to as a distance sensor, is usually disposed on the front panel of the terminal 500. The proximity sensor 516 is configured to collect a distance between a user and the front surface of the terminal 500. In an embodiment, in the case that the proximity sensor 516 detects that the distance between the user and the front surface of the terminal 500 gradually becomes smaller, the display 505 is controlled by the processor 501 to switch from a screen-on state to a screen-off state. In a case that the proximity sensor 516 detects that the distance between the user and the front surface of the terminal 500 gradually increases, the display 505 is controlled by the processor 501 to switch from the screen-off state to the screen-on state.

A person skilled in the art may understand that the structure shown in FIG. 5 does not constitute a limitation to the terminal 500, and the terminal may include more or fewer components than those shown in the figure, or some components may be combined, or a different component deployment may be used.

In an exemplary embodiment, a computer-readable storage medium is provided, for example, a memory including instructions. The foregoing instructions may be executed by a processor in a terminal to perform the method for determining volume adjustment ratio information in the foregoing embodiment. For example, the computer-readable storage medium may be a ROM, a random access memory (RAM), a CD-ROM, a magnetic tape, a floppy disk, an optical data storage device, or the like.

A person of ordinary skill in the art can understand that all or part of steps in the embodiments may be completed by hardware or by a program instructing relevant hardware. The programs may be stored in a computer-readable storage medium, and the storage medium may be a read-only memory (ROM), a disk, or a compact disc.

The above descriptions are merely preferred examples of the present disclosure and are not intended to limit the present disclosure. Any modification, equivalent replacement, and improvement within the spirit and principle of the present disclosure shall be included within the protection scope of the present disclosure.

What is claimed is:

1. A method for determining volume adjustment ratio information, applied to a terminal, comprising:

acquiring a first singing audio and an original accompaniment audio corresponding to the first singing audio, wherein the first singing audio is obtained by synthesizing human voice audio recorded by a user through a singing application and an accompaniment audio of a corresponding singing song;

acquiring a first audio of a non-singing part in the first singing audio, and acquiring a loudness characteristic of the first audio;

acquiring, in the original accompaniment audio, a second audio whose playback duration corresponds to a playback duration of the first audio, and acquiring a loudness characteristic of the second audio;

determining a ratio of the loudness characteristic of the first audio to the loudness characteristic of the second audio as adjustment ratio information for adjusting an accompaniment volume of the first singing audio; and generating an accompaniment audio with volume being adjusted based on the adjustment ratio information.

2. The method according to claim 1, wherein said acquiring the first audio of the non-singing part in the first singing audio comprises:

acquiring a playback start time point and a playback end time point of each sentence of lyrics in lyric data corresponding to the first singing audio; and determining a plurality of first audio segments of the non-singing part in the first singing audio based on the playback start time point and the playback end time point of each sentence of lyrics, and acquiring the first audio by combining the plurality of first audio segments according to a playback time sequence.

3. The method according to claim 2, wherein said acquiring, in the original accompaniment audio, the second audio whose playback duration corresponds to the playback duration of the first audio comprises:

determining, in the original accompaniment audio, a plurality of second audio segments corresponding to the non-singing part in the first singing audio based on the playback start time point and the playback end time point of each sentence of lyrics, and acquiring the second audio by combining the plurality of second audio segments according to the playback time sequence.

4. The method according to claim 1, wherein said acquiring the loudness characteristic of the first audio comprises: dividing the first audio into a plurality of third audio segments with a predetermined duration, and determining a loudness characteristic of each of the third audio segments; and said acquiring the loudness characteristic of the second audio comprises: dividing the second audio into a plurality of fourth audio segments with a predetermined duration, and determining a loudness characteristic of each of the fourth audio segments.

5. The method according to claim 4, wherein said determining the ratio of the loudness characteristic of the first audio to the loudness characteristic of the second audio as the adjustment ratio information for adjusting the accompaniment volume of the first singing audio comprises:

selecting a first predetermined number of first loudness characteristics which are a previous part of loudness characteristics of all of the third audio segments arranged in ascending order, and selecting a first predetermined number of second loudness characteristics which are a previous part of loudness characteristics of all of the fourth audio segments arranged in ascending order; and determining a ratio of a sum of the first predetermined number of first loudness characteristics to a sum of the first predetermined number of second loudness characteristics as the adjustment ratio information for adjusting the accompaniment volume of the first singing audio.

6. The method according to claim 4, wherein said determining the loudness characteristic of each of the third audio segments comprises: uniformly selecting a predetermined number of playback time points in each of the third audio segments, and determining a root mean square of audio amplitudes corresponding to the predetermined number of playback time points as the loudness characteristic of a respective third audio segment; and said determining the loudness characteristic of each of the fourth audio segments comprises: uniformly selecting the predetermined number of playback time points in each of the fourth audio segments, and determining a root mean square of audio amplitudes corresponding to the predetermined number of playback time points as the loudness characteristic of the fourth audio segment.

7. The method according to claim 1, wherein after said determining the ratio of the loudness characteristic of the first audio to the loudness characteristic of the second audio as the adjustment ratio information for adjusting the accompaniment volume of the first singing audio, further comprising:

acquiring an adjusted accompaniment audio by adjusting a volume of the original accompaniment audio based on the adjustment ratio information; and recording a second singing audio based on the adjusted accompaniment audio.

8. The method according to claim 7, wherein said recording the second singing audio based on the adjusted accompaniment audio comprises:

acquiring segment time information for performing segment re-recording on the first singing audio;

extracting a part of the adjusted accompaniment audio based on the segment time information, and recording a singing audio segment based on the part of the adjusted accompaniment audio; and acquiring the second singing audio by replacing a singing audio segment corresponding to the segment time information in the first singing audio with the singing audio segment.

9. A non-transitory computer-readable storage medium storing at least one instruction therein, wherein the at least one instruction, when loaded and executed by a processor, causes the processor to perform the method for determining volume adjustment ratio information as defined in claim 1.

10. An apparatus for determining volume adjustment ratio information, comprising:

a processor; and a memory configured to store at least one instruction executable by the processor; wherein the processor, when executing the at least one instruction, is caused to perform a method for determining volume adjustment ratio information comprising:

acquiring a first singing audio and an original accompaniment audio corresponding to the first singing audio, wherein the first singing audio is obtained by synthesizing human voice audio recorded by a user through a singing application and an accompaniment audio of a corresponding singing song;

acquiring a first audio of a non-singing part in the first singing audio, and acquiring a loudness characteristic of the first audio;

acquiring, in the original accompaniment audio, a second audio whose playback duration corresponds to a playback duration of the first audio, and acquiring a loudness characteristic of the second audio;

determining a ratio of the loudness characteristic of the first audio to the loudness characteristic of the second audio as adjustment ratio information for adjusting an accompaniment volume of the first singing audio; and obtaining an accompaniment audio with volume being adjusted based on the adjustment ratio information.

11. The apparatus according to claim 10, wherein said acquiring the first audio of the non-singing part in the first singing audio comprises:

acquiring a playback start time point and a playback end time point of each sentence of lyrics in lyric data corresponding to the first singing audio; and determining a plurality of first audio segments of the non-singing part in the first singing audio based on the playback start time point and the playback end time point of each sentence of lyrics, and acquiring the first audio by combining the plurality of first audio segments according to a playback time sequence.

12. The apparatus according to claim 11, wherein said acquiring, in the original accompaniment audio, the second audio whose playback duration corresponds to the playback duration of the first audio comprises:

determining, in the original accompaniment audio, a plurality of second audio segments corresponding to the non-singing part in the first singing audio based on the playback start time point and the playback end time point of each sentence of lyrics, and acquiring the second audio by combining the plurality of second audio segments according to the playback time sequence.

13. The apparatus according to claim 10, wherein said acquiring the loudness characteristic of the first audio comprises: dividing the first audio into a plurality of third audio segments with a predetermined duration, and determining a loudness characteristic of each of the third audio segments; and said acquiring the loudness characteristic of the second audio comprises: dividing the second audio into a plurality of fourth audio segments with a predetermined duration, and determining a loudness characteristic of each of the fourth audio segments.

14. The apparatus according to claim 13, wherein said determining the ratio of the loudness characteristic of the first audio to the loudness characteristic of the second audio as the adjustment ratio information for adjusting the accompaniment volume of the first singing audio comprises:

selecting a first predetermined number of first loudness characteristics which are a previous part of loudness characteristics of all of the third audio segments arranged in ascending order, and selecting a first predetermined number of second loudness characteristics which are a previous part of loudness characteristics of all of the fourth audio segments arranged in ascending order; and determining a ratio of a sum of the first predetermined number of first loudness characteristics to a sum of the first predetermined number of second loudness characteristics as the adjustment ratio information for adjusting the accompaniment volume of the first singing audio.

15. The apparatus according to claim 13, wherein said determining the loudness characteristic of each of the third audio segments comprises: uniformly selecting a predetermined number of playback time points in each of the third audio segments, and determining a root mean square of audio amplitudes corresponding to the predetermined number of playback time points as the loudness characteristic of a respective third audio segment; and said determining the loudness characteristic of each of the fourth audio segments comprises: uniformly selecting a predetermined number of playback time points in each of the fourth audio segments, and determining a root mean square of audio amplitudes corresponding to the predetermined number of playback time points as the loudness characteristic of the fourth audio segment.

16. The apparatus according to claim 10, after said determining the ratio of the loudness characteristic of the first audio to the loudness characteristic of the second audio as the adjustment ratio information for adjusting the accompaniment volume of the first singing audio, the method performed by the processor further comprises:

acquiring an adjusted accompaniment audio by adjusting a volume of the original accompaniment audio based on the adjustment ratio information; and recording a second singing audio based on the adjusted accompaniment audio.

17. The apparatus according to claim 16, wherein said recording the second singing audio based on the adjusted accompaniment audio comprises:

acquiring segment time information for performing segment re-recording on the first singing audio;

extracting a part of the adjusted accompaniment audio based on the segment time information, and recording a singing audio segment based on the part of the adjusted accompaniment audio; and acquiring the second singing audio by replacing a singing audio segment in the first singing audio corresponding to the segment time information with the singing audio segment.

18. A computer device, comprising a processor and a memory storing at least one instruction, wherein the processor, when loading and executing the at least one instruction, is caused to perform a method for determining volume adjustment ratio information comprising:

acquiring a first singing audio and an original accompaniment audio corresponding to the first singing audio, wherein the first singing audio is obtained by synthesizing human voice audio recorded by a user through a singing application and an accompaniment audio of a corresponding singing song;

acquiring a first audio of a non-singing part in the first singing audio, and acquiring a loudness characteristic of the first audio;

acquiring, in the original accompaniment audio, a second audio whose playback duration corresponds to a playback duration of the first audio, and acquiring a loudness characteristic of the second audio;

determining a ratio of the loudness characteristic of the first audio to the loudness characteristic of the second audio as adjustment ratio information for adjusting an accompaniment volume of the first singing audio; and generating an accompaniment audio with volume being adjusted based on the adjustment ratio information.

19. The computer device according to claim 18, wherein said acquiring the first audio of the non-singing part in the first singing audio comprises:

acquiring a playback start time point and a playback end time point of each sentence of lyrics in lyric data corresponding to the first singing audio; and determining a plurality of first audio segments of the non-singing part in the first singing audio based on the playback start time point and the playback end time point of each sentence of lyrics, and acquiring the first audio by combining the plurality of first audio segments according to a playback time sequence.

20. The computer device according to claim 19, wherein said acquiring, in the original accompaniment audio, the second audio whose playback duration corresponds to the playback duration of the first audio comprises:

determining, in the original accompaniment audio, a plurality of second audio segments corresponding to the non-singing part in the first singing audio based on the playback start time point and the playback end time point of each sentence of lyrics, and acquiring the second audio by combining the plurality of second audio segments according to the playback time sequence.

* * * * *